United States Patent
Bouchon

(10) Patent No.: US 6,909,200 B2
(45) Date of Patent: Jun. 21, 2005

(54) METHODS OF SUPPLYING ENERGY TO AN ENERGY BUS IN A HYBRID ELECTRIC VEHICLE, AND APPARATUSES, MEDIA AND SIGNALS FOR THE SAME

(75) Inventor: Nicolas Louis Bouchon, Vancouver (CA)

(73) Assignee: Azure Dynamics Inc., Vancouver (CA)

( * ) Notice: Subject to any disclaimer, the term of this patent is extended or adjusted under 35 U.S.C. 154(b) by 295 days.

(21) Appl. No.: 10/084,331

(22) Filed: Feb. 28, 2002

(65) Prior Publication Data

US 2005/0057098 A1 Mar. 17, 2005

(51) Int. Cl.$^7$ ................................................ H02G 3/00
(52) U.S. Cl. ...................... 307/10.1; 307/9.1; 180/65.2; 318/139; 701/93
(58) Field of Search ........................ 370/10.1; 180/65.2; 318/139; 701/93

(56) References Cited

U.S. PATENT DOCUMENTS

| | | | |
|---|---|---|---|
| 5,153,496 A | | 10/1992 | LaForge |
| 5,406,126 A | * | 4/1995 | Hadley et al. ................ 290/45 |
| 5,418,437 A | | 5/1995 | Couture et al. ............. 318/139 |
| 5,511,859 A | | 4/1996 | Kade et al. ..................... 303/3 |
| 5,568,023 A | * | 10/1996 | Grayer et al. ............... 318/139 |
| 5,625,272 A | | 4/1997 | Takahashi |
| 5,637,987 A | * | 6/1997 | Fattic et al. .................. 322/40 |
| 5,644,202 A | * | 7/1997 | Toriyama et al. ........... 318/369 |
| 5,666,040 A | | 9/1997 | Bourbeau |
| 5,820,172 A | | 10/1998 | Brigham et al. ............. 290/40 |
| 5,828,192 A | * | 10/1998 | Kawaguchi et al. ........ 318/139 |
| 5,839,800 A | | 11/1998 | Koga et al. .................. 303/152 |
| 5,869,950 A | | 2/1999 | Hoffman, Jr. et al. |
| 5,898,282 A | | 4/1999 | Drozdz et al. ............... 318/139 |
| 5,932,990 A | | 8/1999 | Kaneko |
| 5,945,808 A | | 8/1999 | Kikuchi et al. |
| 5,952,815 A | | 9/1999 | Rouillard et al |
| 5,998,972 A | | 12/1999 | Gong |
| 5,999,864 A | * | 12/1999 | Thiel et al. .................. 701/22 |
| 6,104,967 A | | 8/2000 | Hagen et al. . |
| 6,184,656 B1 | | 2/2001 | Karunasiri et al. |
| 6,242,873 B1 | | 6/2001 | Drozdz et al. |
| 6,262,561 B1 | | 7/2001 | Takahashi et al. |
| 6,271,645 B1 | | 8/2001 | Schneider et al. |
| 6,271,647 B2 | | 8/2001 | Galbraith et al. |
| 6,290,012 B1 | | 9/2001 | Matsubara et al. ......... 180/65.4 |
| 6,362,602 B1 | | 3/2002 | Kozarekar |
| 6,484,830 B1 | * | 11/2002 | Gruenwald et al. ......... 180/65.2 |
| 6,488,345 B1 | * | 12/2002 | Woody et al. ............... 303/152 |
| 6,612,246 B2 | * | 9/2003 | Kumar ........................ 105/34.2 |
| 6,651,759 B1 | * | 11/2003 | Gruenwald et al. ......... 180/65.2 |
| 2001/0017227 A1 | | 8/2001 | Amano et al. |
| 2001/0035740 A1 | | 11/2001 | Palanisamy ................. 320/147 |
| 2001/0039230 A1 | | 11/2001 | Severinsky et al. |
| 2002/0011820 A1 | | 1/2002 | Suzuki et al. |

FOREIGN PATENT DOCUMENTS

| | | |
|---|---|---|
| EP | 0798 839 A2 | 10/1997 |
| EP | 1 142 749 A2 | 10/2001 |
| WO | 01/33690 A1 | 5/2001 |

OTHER PUBLICATIONS

Galdi V.; Ippolito L.; Piccolo A.; Vaccaro A.; Multi–Objective Optimization for Fuel Economy and Emissions of HEV Using the Goal–Attainingment Method:, EVS 18, 2001.

* cited by examiner

Primary Examiner—Robert L. Debeeradinis

(57) ABSTRACT

Methods, apparatuses, media and signals for supplying energy to an energy bus in communication with an energy generating device and with a regenerative braking system in a hybrid electric vehicle are disclosed. One such method includes controlling power supplied by the energy generating device to the energy bus, in response to a braking signal indicative of user brake actuation. Another such method involves controlling energy contributions onto the energy bus from the energy generating device and from the regenerative braking system respectively, to prevent the contributions from exceeding a desired total energy contribution. The energy generating device may include an auxiliary power unit, such as fuel cell, or a generator coupled to a prime mover such as an internal combustion engine, for example.

101 Claims, 6 Drawing Sheets

METHODS OF SUPPLYING ENERGY TO AN ENERGY BUS IN A HYBRID ELECTRIC VEHICLE, AND APPARATUSES, MEDIA AND SIGNALS FOR THE SAME

FIELD OF THE INVENTION

The present Invention relates to vehicles, and more particularly to methods, apparatuses, media and signals for supplying energy to an energy bus in a hybrid electric vehicle.

BACKGROUND OF THE INVENTION

An electric or hybrid electric vehicle typically employs electric traction motors connected to drive wheels of the vehicle. The traction motors typically receive electrical energy from an energy bus of the vehicle, in response to which the motors apply a torque to the drive wheels, thereby causing the vehicle to accelerate.

In a "series" hybrid electric vehicle, there are typically two available power sources to supply energy to the traction motors to drive the vehicle: an auxiliary power unit or other energy generating device, and an energy storage system.

The auxiliary power unit typically converts another form of energy into electrical energy which it supplies to the energy bus, but is usually not capable of drawing electrical energy from the energy bus and converting it into another form for storage. For example, the auxiliary power unit often includes an internal combustion engine coupled to an electrical generator, for converting mechanical energy derived from the chemical combustion of gasoline (or other hydrocarbons or other fuels) into electrical energy. More recently, fuel cells for generating electrical energy from other chemical processes such as oxidation of hydrogen for example, have been used as auxiliary power units.

The energy storage system (ESS) typically includes a system capable of both supplying electrical power to the energy bus when needed, and capable of receiving surplus electrical energy from the energy bus and storing such energy for future use. For example, the ESS often includes a battery or a set of batteries, or a capacitor bank. When the auxiliary power unit is not operating (or is not supplying sufficient electrical energy to meet the current demands of the vehicle), the ESS will be called upon to supply stored electrical energy to the energy bus in order to drive the traction motors and other electrical devices of the vehicle. Conversely, when the combustion engine or other auxiliary power unit is operating. It often supplies more electrical energy to the energy bus than is required to operate the traction motors to propel the vehicle and to operate other electrical devices of the vehicle, in which case the ESS may draw a charging current from the energy bus in order to store the surplus energy for future use.

In addition to storing such surplus energy from the auxiliary power unit, the energy storage system may also receive and store surplus electrical energy produced during regenerative braking of the vehicle. In this regard, the traction motors may be used as a regenerative braking system for braking the vehicle, by discontinuing the supply of electrical power to the traction motors while leaving the traction motors fully or partially engaged with the drive wheels. During such regenerative braking, the momentum of the vehicle and resulting forced rotation of the drive wheels causes a corresponding forced rotation of the electric traction motors, which act as generators driven by the drive wheels. Effectively, the electric traction motors serve to decelerate the vehicle by converting its kinetic energy into electrical energy which is supplied back to the energy bus. During regenerative braking, the amount of electrical energy supplied to the energy bus by the regenerative braking system typically significantly exceeds the instantaneous electrical energy needs of the vehicle, because the largest electrical loads, namely, the traction motors themselves, have ceased drawing energy and are now supplying significant amounts of electrical energy back to the energy bus. Therefore, regenerative braking typically produces a significant amount of surplus electrical energy that can be stored by the energy storage system.

Thus, in a series hybrid electric vehicle, there are typically two energy sources capable of supplying surplus electrical energy to charge the energy storage system: the auxiliary power unit, and the traction motors acting as a regenerative braking system.

However, the ability of the energy storage system to safely receive and store energy is typically limited by a number of factors, such as its state of charge, its temperature, its age, and its previous operating conditions, for example. Exceeding the charge acceptance limit of the energy storage system may lead to over-voltage conditions, potentially damaging the energy storage system, and also potentially damaging other electronic components connected to the energy bus.

Therefore, to the extent that the auxiliary power unit and the regenerative braking system may produce surplus electrical energy (i.e., energy in excess of the current electrical needs of the vehicle), if such surplus electrical energy exceeds the amount of energy the energy storage system can safely store, the energy storage system and other electric and/or electronic components of the vehicle may be damaged.

A number of systems have been proposed for monitoring and controlling electrical energy generated by a regenerative braking system and/or an auxiliary power unit, for various purposes. One such system involves detecting a voltage generated by the regenerative braking system, detecting a voltage generated by a generator coupled to an internal combustion engine, and reducing the amount of regenerative braking if the regenerative voltage exceeds the generator's voltage, in order to protect an internal combustion engine against over-speed operation. It is noted that reducing regenerative braking output in favor of the generator output disadvantageously reduces vehicle efficiency.

More significantly, existing systems tend to be reactionary in nature, and often cannot prevent short but damaging voltage spikes from occurring. For example, in a conventional series hybrid electric vehicle, if a user of the vehicle is accelerating at full throttle, the auxiliary power unit will be operating at full power, supplying its maximum amount of electrical energy to the energy bus in order to power the traction motors. If the user then brakes suddenly, the traction motors suddenly switch from operating as a large energy drain to operating as a generator, supplying a large supply of electrical energy to the energy bus, while at the same time, the auxiliary power unit will still initially be operating at or near full power, not having had sufficient time to reduce its output. The resulting surplus electrical energy supplied to the energy bus by the traction motors and the auxiliary power unit typically largely exceeds the charge acceptance of the energy storage system, and the resulting over-voltage condition on the energy bus not only has a detrimental effect on the service life of the energy storage system, but is also potentially damaging to other electronic and/or electrical devices connected to the energy bus. A conventional reactionary system may detect and respond to the over-voltage condition, but typically not until after such potentially damaging voltage spikes have occurred.

Accordingly, there is a need for an improved way of supplying energy in a hybrid electric vehicle.

SUMMARY OF THE INVENTION

The present invention addresses the above need by providing, in accordance with one aspect of the invention, a method of supplying energy to an energy bus in communication with an energy generating device and with a regenerative braking system in a hybrid electric vehicle. The method includes controlling power supplied by the energy generating device to the energy bus, in response to a braking signal indicative of user brake actuation.

By controlling power supplied by the energy generating device in response to the braking signal, the power may be controlled proactively, to prevent an over-voltage condition from occurring, in contrast with previous systems that react to an over-voltage condition that is in the process of occurring.

Controlling power preferably includes controlling power supplied by an auxiliary power unit (APU) of the vehicle. This may include controlling a current supplied by a generator, or may include controlling a current supplied by a fuel cell, for example.

Controlling preferably includes commencing the controlling no later than a time at which the regenerative braking system of the vehicle commences supplying energy to the energy bus.

Controlling preferably includes reducing the power supplied by the energy generating device to the energy bus. If so, the method may further include increasing power supplied by the regenerative braking system of the vehicle to the energy bus, while reducing the power supplied by the energy generating device to the energy bus.

Thus, in such an embodiment, regenerative braking energy is effectively favored over energy supplied by the energy generating device, thereby improving the efficiency of the vehicle by increasing the amount of energy recovered from the vehicle's kinetic energy while decreasing fuel consumption.

Increasing power may include increasing a regenerative braking torque applied by the regenerative braking system until a desired regenerative braking torque is achieved.

The method may further Include identifying a total desired braking torque in response to the braking signal. The method may also include identifying a maximum available regenerative braking torque. In this case, the method preferably further includes identifying a maximum desired regenerative braking torque, in response to the total desired braking torque and the maximum available regenerative braking torque.

Identifying the maximum desired regenerative braking torque may include setting the maximum desired regenerative braking torque equal to the lesser of: (a) the total desired braking torque; (b) the maximum available regenerative braking torque; and (c) a torque equivalent of a desired current drain from the energy bus, the desired current drain including a desired charging current for charging an energy storage system (ESS) in communication with the energy bus.

Controlling may include setting a desired power output of the energy generating device, in response to the maximum desired regenerative braking torque. Setting the desired power output may include setting a desired current level of an auxiliary power unit (APU) of the vehicle, which may include setting the desired current level equal to the lesser of: (a) a present desired current level of the APU; and (b) a desired current drain from the energy bus including a desired charging current for charging an energy storage system (ESS) in communication with the energy bus, minus a current equivalent of the maximum desired regenerative braking torque.

The method may further include setting a present desired regenerative braking torque of a regenerative braking system of the vehicle, in response to the maximum desired regenerative braking torque and the power supplied by the energy generating device to the energy bus. This may include setting the present desired regenerative braking torque equal to the lesser of: (a) the maximum desired regenerative braking torque; and (b) a torque equivalent of: (i) a desired current drain from the energy bus, the desired current drain including a desired charging current for charging an energy storage system (ESS) in communication with the energy bus; minus (ii) an actual current supplied by the energy generating device to the energy bus.

The method may further include identifying, as the desired charging current, a maximum allowable charging current for charging the ESS.

The method may further include setting a friction braking torque of a friction braking system of the vehicle. This may include setting the friction braking torque equal to a difference between the present desired regenerative braking torque and the total desired braking torque. Thus, friction brakes may be used to complement the regenerative braking system if required, in order to provide adequate total braking torque to provide a consistent and predictable brake feel.

Controlling preferably includes controlling energy contributions onto the energy bus from the energy generating device and from a regenerative braking system of the vehicle respectively, to prevent the contributions from exceeding a desired total energy contribution.

In accordance with another aspect of the invention, there is provided an apparatus for supplying energy to an energy bus in communication with an energy generating device and with a regenerative braking system in a hybrid electric vehicle. The apparatus includes a processor circuit configured to control power supplied by the energy generating device to the energy bus, in response to a braking signal indicative of user brake actuation.

The processor circuit may be programmed or configured to perform the various methods described herein.

In accordance with another aspect of the invention, there is provided a system including an apparatus as described above and further including the energy generating device, the energy generating device being in communication with the processor circuit and with the energy bus.

The energy generating device may include an auxiliary power unit (APU) of the vehicle. The APU may include a generator, or may include a fuel cell, for example.

The system may further include the energy bus.

The system may further include the regenerative braking system, the regenerative braking system being in communication with the processor circuit and with the energy bus. The processor circuit may be configured to increase power supplied by the regenerative braking system to the energy bus, while reducing the power supplied by the energy generating device to the energy bus.

The system may further include an energy storage system (ESS) in communication with the energy bus.

In accordance with another aspect of the invention, there is provided an apparatus for supplying energy to an energy bus in communication with energy generating means and with regenerative braking means in a hybrid electric vehicle. The apparatus includes means for receiving a braking signal indicative of user brake actuation, and means for controlling power supplied by the energy generating means to the energy bus, in response to the braking signal.

The apparatus may further include means for performing any of the functions or methods described herein. Such means may include the aforementioned means or may include additional means for performing such functions.

In accordance with another aspect of the invention, there is provided a system including an apparatus as described above and further including the energy generating means for generating the power supplied by the energy generating means to the energy bus, the energy generating means being in communication with the means for reducing power and with the energy bus.

The energy generating means may include an auxiliary power unit (APU) of the vehicle.

The system may further include the regenerative braking means for regeneratively braking the vehicle, the regenerative braking means being in communication with the energy bus.

The system may further include an energy storage means for storing energy, in communication with the energy bus.

In accordance with another aspect of the invention, there is provided a computer readable medium providing codes for directing a processor circuit to control power supplied by an energy generating device to an energy bus in communication with the energy generating device and with a regenerative braking system in a hybrid electric vehicle, in response to a braking signal indicative of user brake actuation.

In accordance with another aspect of the invention, there is provided a signal including code segments for directing a processor circuit to control power supplied by an energy generating device to an energy bus in communication with the energy generating device and with a regenerative braking system in a hybrid electric vehicle, in response to a braking signal indicative of user brake actuation.

In accordance with another aspect of the invention, there is provided a method of supplying energy to an energy bus in a hybrid electric vehicle. The method includes controlling energy contributions onto the energy bus from an energy generating device and from a regenerative braking system respectively, to prevent the contributions from exceeding a desired total energy contribution.

Controlling preferably includes reducing power supplied by the energy generating device to the energy bus.

More particularly, controlling preferably includes reducing power supplied by the energy generating device to the energy bus, while increasing power supplied by the regenerative braking system to the energy bus. Increasing power preferably includes increasing a regenerative braking torque applied by the regenerative braking system until a desired regenerative braking torque is achieved.

The method may further include identifying a maximum desired regenerative braking torque to be applied by the regenerative braking system. If so, controlling preferably includes setting a desired energy contribution of the energy generating device, in response to the maximum desired regenerative braking torque.

The method may further include setting a present desired regenerative braking torque of the regenerative braking system, in response to the maximum desired regenerative braking torque and an actual energy contribution supplied by the energy generating device to the energy bus.

Controlling preferably includes controlling power supplied by the energy generating device to the energy bus, in response to a braking signal indicative of user brake actuation.

In accordance with another aspect of the invention, there is provided an apparatus for supplying energy to an energy bus in a hybrid electric vehicle. The apparatus includes a processor circuit configured to control energy contributions onto the energy bus from an energy generating device and from a regenerative braking system respectively, to prevent the contributions from exceeding a desired total energy contribution.

The processor circuit may be further programmed or configured to perform the various methods described herein.

In accordance with another aspect of the invention, there is provided an apparatus for supplying energy to an energy bus in a hybrid electric vehicle.

The apparatus includes first means for controlling a first energy contribution onto the energy bus from energy generating means, and second means for controlling a second energy contribution onto the energy bus from regenerative braking means. The first and second means for controlling cooperate to prevent the contributions from exceeding a desired total energy contribution.

The apparatus may further include means for performing the various functions or methods described herein. Such means may include the aforementioned means or may include additional means for performing such functions.

In accordance with another aspect of the invention, there is provided a computer readable medium providing codes for directing a processor circuit to control energy contributions onto an energy bus in a hybrid electric vehicle from an energy generating device and from a regenerative braking system respectively, to prevent the contributions from exceeding a desired total energy contribution.

In accordance with another aspect of the invention, there is provided a signal including code segments for directing a processor circuit to control energy contributions onto an energy bus in a hybrid electric vehicle from an energy generating device and from a regenerative braking system respectively, to prevent the contributions from exceeding a desired total energy contribution.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
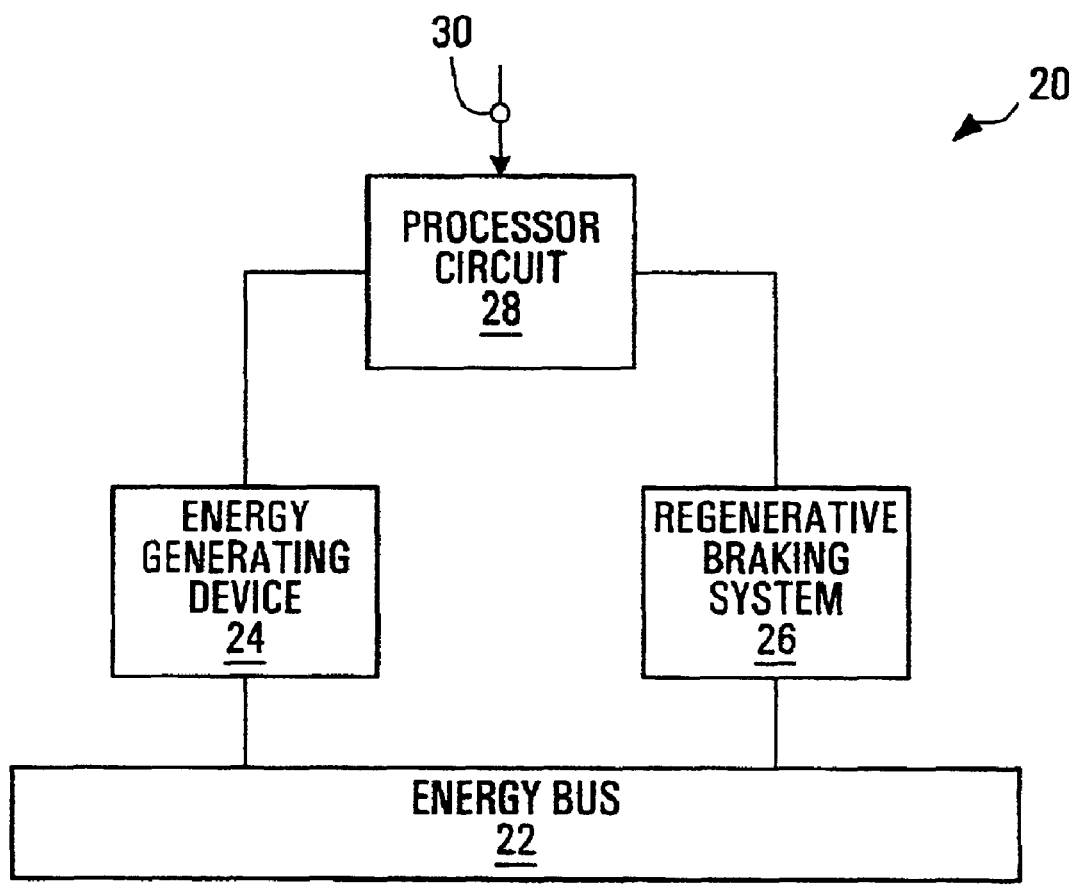
FIG. 1 is a block diagram of an apparatus for supplying energy to an energy bus in communication with an energy generating device and with a regenerative braking system in a hybrid electric vehicle, according to a first embodiment of the invention.

Referring to FIG. 1, an apparatus according to a first embodiment of the invention is shown generally at 20. In this embodiment, the apparatus is used for supplying energy to an energy bus 22 in communication with an energy generating device 24 and with a regenerative braking system 26 in a hybrid electric vehicle (not shown). The apparatus 20 includes a processor circuit 28, configured to control power supplied by the energy generating device 24 to the energy bus 22, in response to a braking signal 30 indicative of user brake actuation.

In this embodiment, the processor circuit 28 is configured to control energy contributions onto the energy bus 22 from the energy generating device 24 and from the regenerative braking system 26 respectively, to prevent the contributions from exceeding a desired total energy contribution.

Figure 2:
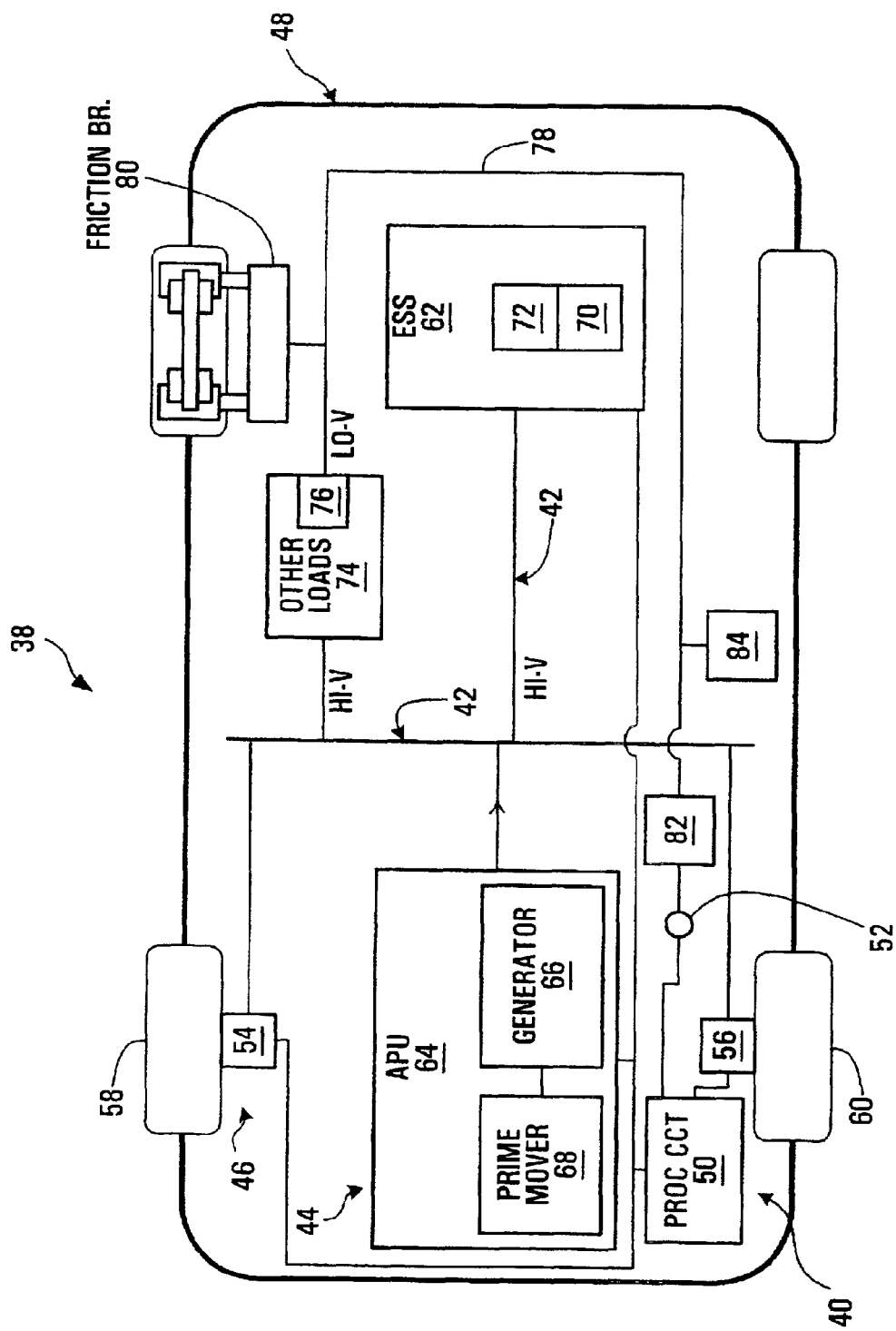
FIG. 2 is a partial schematic illustration of an apparatus for supplying energy to an energy bus in communication with an energy generating device and with a regenerative braking system in a hybrid electric vehicle, according to a second embodiment of the invention, with some components and connections omitted for ease of illustration.

Referring to FIG. 2, a system according to a second embodiment of the invention is shown generally at 38. In this embodiment, the system 38 includes an apparatus 40 for supplying energy to an energy bus 42 in communication with an energy generating device shown generally at 44 and with a regenerative braking system shown generally at 46, in a hybrid electric vehicle 48. In this embodiment, the apparatus 40 includes a processor circuit 50 configured to control power supplied by the energy generating device 44 to the energy bus 42, in response to a braking signal 52 indicative of user brake actuation. In this embodiment, the processor circuit 50 is also configured to control energy contributions onto the energy bus 42 from the energy generating device 44 and from the regenerative braking system 46 respectively, to prevent the contributions from exceeding a desired total energy contribution.

In this embodiment, the hybrid electric vehicle 48 includes a series hybrid electric vehicle. The regenerative braking system 46 is in communication with the processor circuit 50 and with the energy bus 42. More particularly, in this embodiment, the regenerative braking system 46 includes first and second traction motors 54 and 56, each in communication with the energy bus 42. The traction motors 54 and 56 are engageable with respective drive wheels 58 and 60, and serve to propel or accelerate the vehicle 48 by applying torque to the drive wheels 58 and 60 in response to electrical energy received by the traction motors 54 and 56 from the energy bus 42. Conversely, during regenerative braking, the traction motors act as generators driven by the drive wheels, thereby effectively converting the kinetic energy of the vehicle into electrical energy supplied to the energy bus. In this embodiment, the traction motors 54 and 56 include traction motors manufactured by Unique Mobility, Inc. of Golden, Colorado, USA. Alternatively, other types of traction motors may be substituted.

In the present embodiment, for ease of illustration, the traction motors 54 and 56 of the regenerative braking system 46 are shown and described only in connection with the drive wheels 58 and 60, which in this embodiment are the front wheels of the hybrid electric vehicle 48. Alternatively, however, such traction motors may be provided in connection with all wheels of the vehicle, thus providing for all wheel drive and for regenerative braking energy recovery from all wheels of the vehicle. Alternatively, a single such traction motor may be provided for each axle of the vehicle rather than for each wheel, if desired. More generally, other types of propulsion and regenerative braking systems may be substituted if desired.

In this embodiment, there are two energy sources operable to supply electrical energy to the traction motors 54 and 56 via the energy bus 42, namely, the energy generating device 44 and an energy storage system (ESS) 62.

Referring to FIG. 2, in this embodiment the energy generating device 44 is in communication with the processor circuit 50 and with the energy bus 42. In the present embodiment, the energy generating device 44 includes an auxiliary power unit (APU) 64 of the vehicle. More particularly, in this embodiment the APU 64 includes a generator 66 coupled to a prime mover 68. The prime mover 68 supplies mechanical energy to the generator 66, which converts such energy into electrical energy, which it then supplies to the energy bus 42. Thus, in the present embodiment, the processor circuit 50 is configured to control the power supplied by the energy generating device to the energy bus by controlling power supplied by the APU 64 of the vehicle 48, or more particularly, by controlling a current supplied by the generator 66 to the energy bus.

In this embodiment, the prime mover 68 includes an internal combustion engine. Alternatively, the generator 66 may be coupled to other types of prime mover. For example, the generator 66 may be coupled to a turbine.

Figure 3:
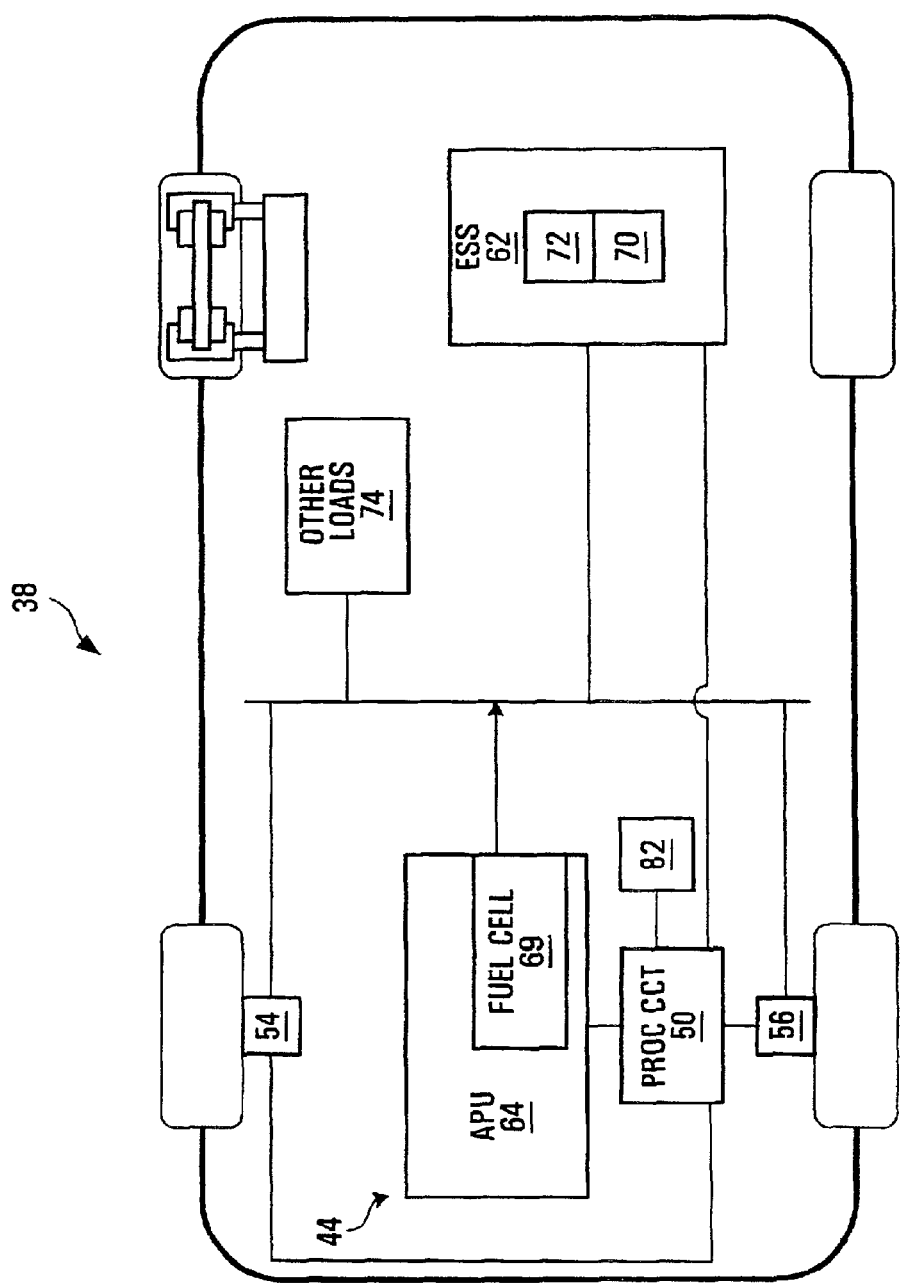
FIG. 3 is a partial schematic illustration of an apparatus for supplying energy to an energy bus in communication with an energy generating device and with a regenerative braking system in a hybrid electric vehicle, according to a third embodiment of the invention, with some components and connections omitted for ease of illustration.

Referring to FIG. 3, aternatively, the auxiliary power unit 64 may include other means for generating energy. For example, in the alternative embodiment shown in FIG. 3, the auxiliary power unit includes a fuel cell 69, and the processor circuit 50 is configured to control the power supplied by the energy generating device 44 by controlling a current supplied by the fuel cell 69, to the energy bus 42.

Referring back to FIG. 2, in the present embodiment, the energy storage system 62 in communication with the processor circuit 50 and with the energy bus 42. The energy storage system 62 of the present embodiment is operable to supply electrical energy to the energy bus 42, which may then supply such energy to the traction motors 54 and 56 to accelerate the vehicle 48. Conversely, when there is a surplus of electrical energy on the energy bus 42, which may result from excess energy supplied by the auxiliary power unit 64 and/or from regenerative braking energy supplied by the regenerative braking system 46, the energy storage system 62 receives and stores such surplus energy for future use. To achieve this, in the present embodiment, the energy storage system 62 includes at least one battery, such as that shown at 70 for example. The ESS 62 further includes an ESS controller 72 for monitoring and regulating the state of charge, temperature and other physical properties of the battery 70.

In the present embodiment, the energy bus 42 includes a direct current electrical bus. More particularly, in this embodiment the energy bus includes electrical wires rated for high-voltage, high-current applications. For example, in the present embodiment the electrical wires of the energy bus include wires rated for 300 amperes of continuous direct current.

In this embodiment, the energy generating device 44, the regenerative braking system 46, the energy storage system 62, and a plurality of other high voltage loads such as those shown at 74, for example, are electrically connected in parallel to the energy bus 42.

The other loads 74 may include other devices of the vehicle 48 requiring a high voltage power supply, such as a power steering system and a heating system, for example. In this embodiment, the other loads 74 further include a step down transformer 76, for providing a low voltage power supply 78 for use by other low voltage devices of the vehicle 48, such as a friction braking system 80, a brake pedal sensor 82 and a speedometer 84, for example.

In this embodiment, the friction braking system 80 includes a conventional friction braking system such as a hydraulic disk or drum brake system, for example. Alternatively, other types of friction braking systems may be substituted. Alternatively, the friction braking system may be omitted if desired, however, it is strongly preferable that a friction braking system be provided for safety reasons. For example, there may be circumstances in which a user of the vehicle 48 wishes or needs to decelerate with a greater braking torque than the regenerative braking system 46 is providing. In addition, as the user-requested braking torque is not the only factor influencing the manner in which the processor circuit 50 of the present embodiment controls the applied regenerative braking torque, this further heightens the desirability of a friction braking system to ensure that the desired braking torque is always supplied, for safety reasons. The friction braking system also complements the regenerative braking system 46 in order to provide and maintain a more predictable and consistent brake feel. Although the friction braking system 80 is shown in FIG. 2 in connection with a single wheel for illustrative purposes, friction braking components are preferably provided for all of the wheels of the vehicle 48.

Figure 4:
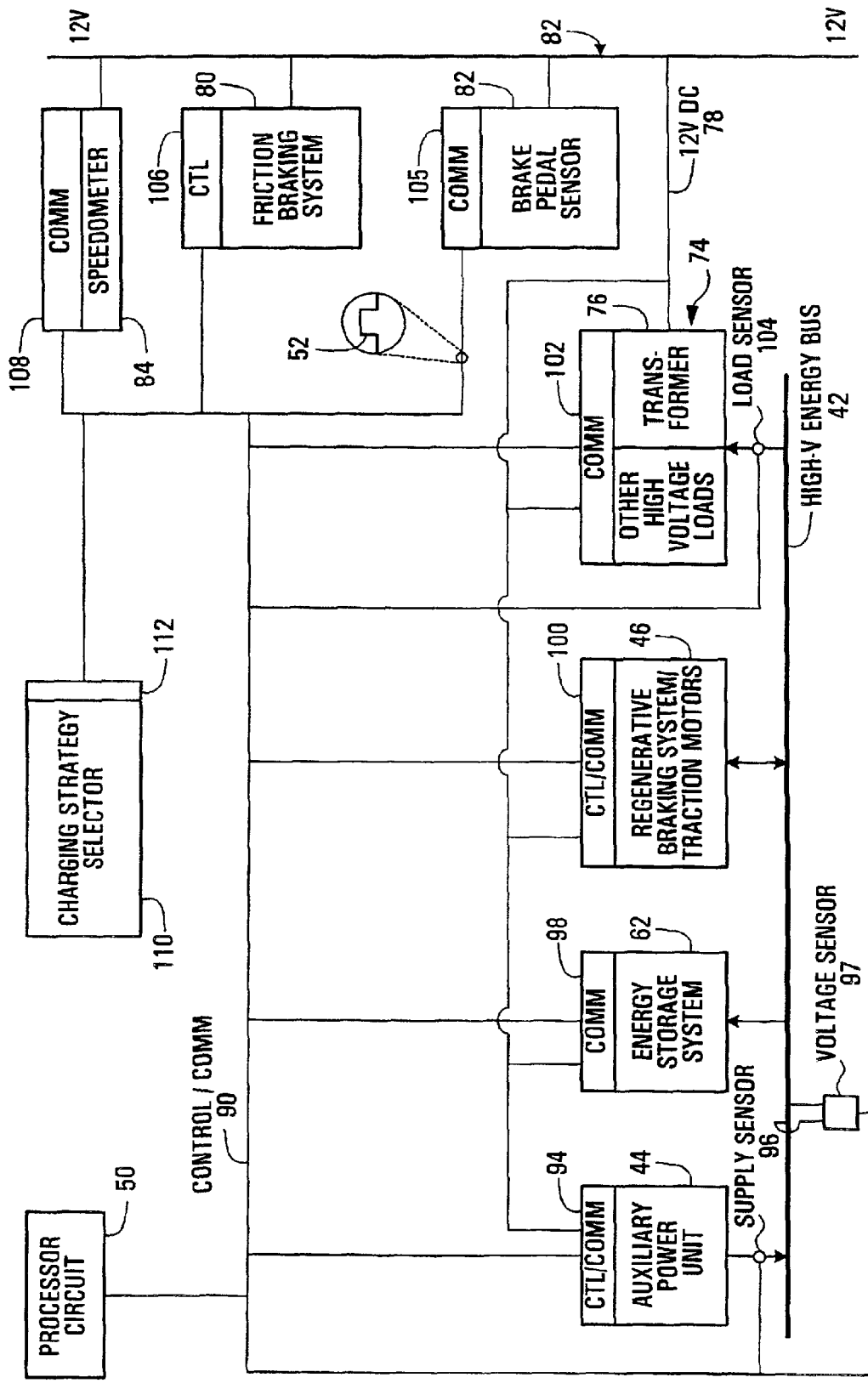
FIG. 4 is a block diagram illustrating communication among a processor circuit, the energy generating device, the regenerative braking system, and various other components of the hybrid electric vehicle shown in FIG. 2.

Referring to FIG. 4, in this embodiment, the processor circuit 50 is in communication with a communications network shown generally at 90. More particularly, in this embodiment, the communications network 90 includes a two wire controller area network (CAN), employing a CAN protocol, to receive communication signals from and transmit control signals to various devices of the hybrid electric vehicle 48. Alternatively, however, other types of communications networks may be substituted.

More particularly, referring to FIGS. 2 and 4, in this embodiment the processor circuit 50 is in communication via the network 90 with the auxiliary power unit 64, via a control/communications interface 94 thereof. The processor circuit is also in communication with a first current sensor 96 for receiving current detection signals therefrom. More particularly still, the first current sensor 96 measures an electric current supplied by the auxiliary power unit 64 to the energy bus 42, and transmits signals representing the current measurement onto the network 90 for receipt by the processor circuit 50.

Similarly, in the present embodiment the processor circuit 50 is also in communication with a voltage sensor 97 for receiving voltage detection signals therefrom. More particularly, the voltage sensor 97 measures a voltage on the energy bus 42, and transmits signals representing the voltage measurement onto the network 90 for receipt by the processor circuit.

In this embodiment, the processor circuit 50 is in further communication, via the network 90, with the energy storage system 62, via a communications interface 98 thereof.

Similarly, in the present embodiment, the processor circuit 50 is in communication via the network 90 with the regenerative braking system 46, via a control/communications interface 100 thereof.

Also in this embodiment, the processor circuit 50 is in communication via the network 90 with the other high voltage loads 74 including the transformer 76, via at least one communications interface 102 thereof. The processor circuit 50 is also in communication with a second current sensor 104 which measures a total electrical current drawn by the other high voltage loads 74 from the energy bus 42, and which transmits signals representing this drawn current measurement onto the network 90 for receipt by the processor circuit 50.

Similarly, in this embodiment, the processor circuit 50 is in communication via the network 90 with a plurality of low voltage devices of the vehicle 48. More particularly, in this embodiment, the processor circuit 50 is in communication with the friction braking system 80 via a control interface 106 thereof, with the brake pedal sensor 82 via a communications interface 105 thereof, and with the speedometer 84 via a communications interface 108 thereof.

In this embodiment, the processor circuit 50 is in further communication via the network 90 with a charging strategy selector 110 via a communications interface 112 thereof. The charging strategy selector 110 selects a particular strategy or method for charging the energy storage system 62. For example, such selectable strategies may include "fast" charging, also referred to as "opportunistic" charging, in which as much current as possible is used to charge the energy storage system, subject only to the maximum allowable charging current receivable by the energy storage system. Such a strategy serves to minimize auxiliary power unit transients. Alternatively, a further charging strategy may include "float" charging, whereby the energy storage system 62 is charged at a different level (typically less than the maximum possible permitted charging level) according to an energy storage system charge profile current level determined by a separate controller of the energy storage system 62. In this embodiment, the charging strategy selector 110 includes a switch that may be actuated by a user of the vehicle 48, to transmit signals onto the communication network 90 representing either a selection of "fast" charging or of "float" charging, respectively. Alternatively, the selection charging strategies may be determined automatically if desired.

If desired, the processor circuit 50 may be in further communication with other additional devices of the vehicle 48, either via the communication network 90 or otherwise.

Figure 5:
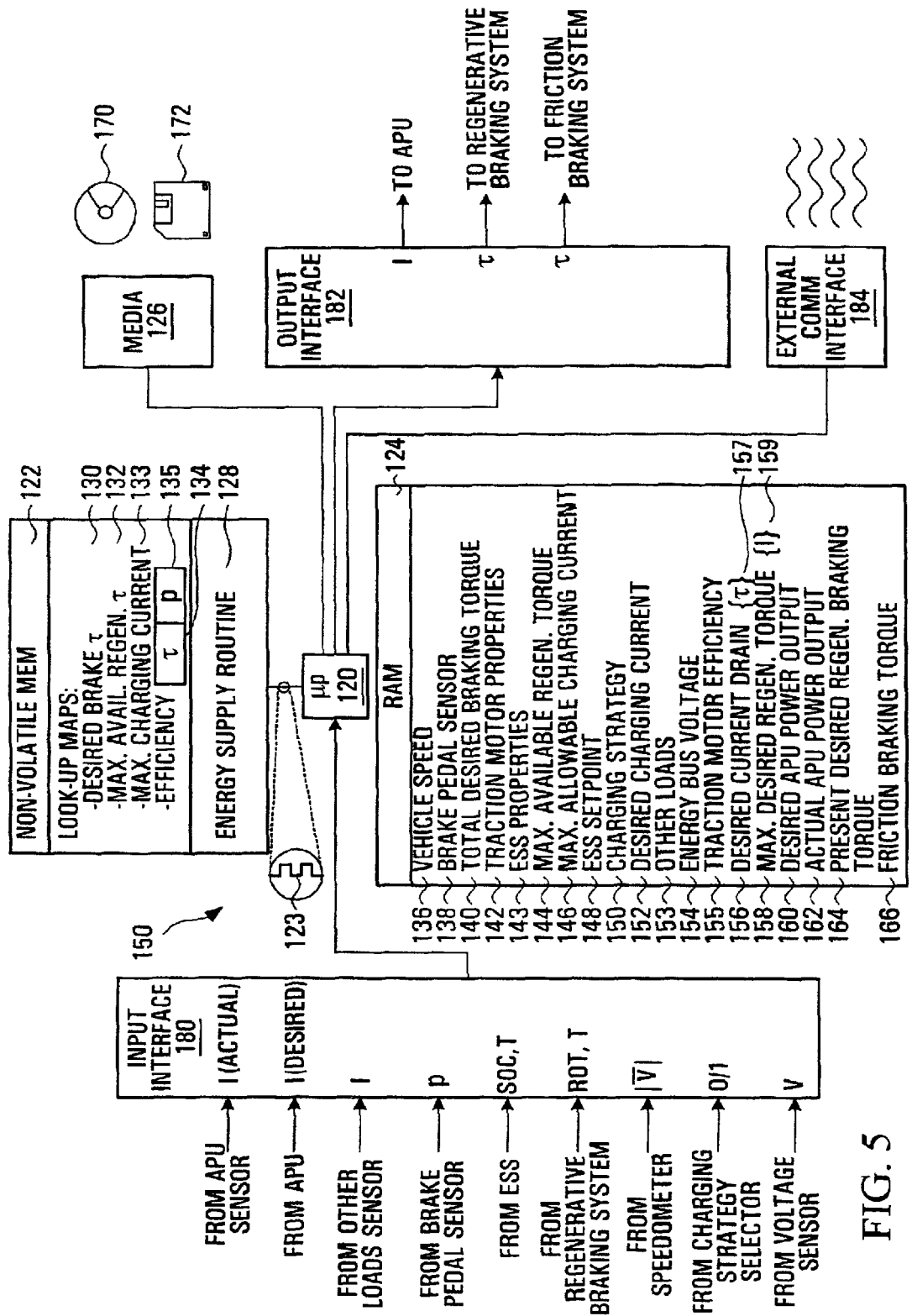
FIG. 5 is a block diagram illustrating the processor circuit of the apparatus shown in FIG. 2.

Referring to FIG. 5, the processor circuit is shown generally at 50. In this embodiment, the processor circuit 50 includes a microprocessor 120. Alternatively, other types of processor circuits may be substituted for the microprocessor 120. More generally, in this specification, the term "processor circuit" is intended to broadly encompass any type of circuit, device or combination of circuits and/or devices capable of performing the functions described herein or equivalent functions, including (without limitation) other types of microprocessors, microcontrollers, other integrated circuits, other types of electrical circuits or combinations of circuits, logic gates or gate arrays, or programmable devices of any sort, either alone or in combination with other such circuits or devices located at the same location or remotely from each other, for example. Additional types of processor circuits will be apparent to those ordinarily skilled in the art upon review of this specification, and substitution of any such other types of processor circuits is considered not to depart from the scope of the present invention as defined by the claims appended hereto.

In this embodiment, the microprocessor 120 is in communication with a plurality of memory devices, including a non-volatile memory 122, a random access memory (RAM) 124, and a media interface 126.

In this embodiment, the non-volatile memory 122 is used to store various routines executable by the microprocessor 120, including an energy supply routine 128. Thus, as discussed in greater detail below in connection with the energy supply routine 128, in this embodiment the non-volatile memory 122 acts as a computer readable medium providing codes for directing the processor circuit 50 to control power supplied by the energy generating device 44 to the energy bus 42 in response to the braking signal 52 indicative of user brake actuation, and similarly, acts as a computer readable medium providing codes for directing the processor circuit to control the energy contributions onto the energy bus from the energy generating device and from the regenerative braking system respectively, to prevent the contributions from exceeding a desired total energy contribution. In this embodiment, the non-volatile memory 122 cooperates with the microprocessor 120 to produce a signal 123 comprising code segments for directing the processor circuit 50 to perform the functions of the energy supply routine 128. Alternatively, however, other ways of generating such signals may be substituted. In this embodiment, the non-volatile memory 122 includes an erasable, re-writable computer readable medium, such as an electrically erasable programmable read only memory (EEPROM) or a FLASH memory, for example. Alternatively, other types of computer readable media may be substituted for the non-volatile memory 122, such as removable media insertable into the media interface 126, for example.

In the present embodiment, the non-volatile memory 122 also stores a plurality of look-up maps for use by the microprocessor in executing the energy supply routine 128, including a desired braking torque look-up map 130, a maximum available regenerative braking torque look-up map 132, a maximum charging current look-up map 133, and first and second traction motor efficiency look-up maps 134 and 135. In this embodiment, the desired braking torque look-up map 130 includes fields for vehicle speed, brake pedal position, and desired braking torque, and thus allows for fast output of a desired braking torque corresponding to vehicle speed and brake pedal position input variables. If desired, further input variable fields may be provided, such as a brake pedal position rate of change field, for example. Similarly, in this embodiment the maximum available regenerative braking torque look-up map 132 includes fields for traction motor rotational speed, traction motor temperature, and maximum available regenerative braking torque, and thus allows for fast output of a maximum available regenerative braking torque corresponding to traction motor rotational speed and temperature input variables. Also in this embodiment, the maximum charging current look-up map 133 includes fields for state of charge, temperature, and maximum allowable charging current, to allow fast identification of the latter in response to the former input variables. In the present embodiment the first traction motor efficiency look-up map 134 includes fields for traction motor torque, traction motor rotational speed, and traction motor efficiency, to allow fast identification of the latter in response to the former two input variables. Similarly, the second traction motor efficiency look-up map 135 includes fields for traction motor-generated power, traction motor rotational speed, and traction motor efficiency, to allow fast identification of the latter in response to the former two input variables.

It will be appreciated that the specific contents of the desired braking torque look-up map 130, the maximum available regenerative braking torque look-up map 132, the maximum charging current look-up map 133 and the efficiency look-up maps 134 and 135 are dependent upon the properties of the particular vehicle to which the look-up maps relate. In this embodiment, the maximum available regenerative braking torque look-up map 132 and the efficiency look-up maps 134 and 135 are provided by the manufacturer of the traction motors 54 and 56, which in this embodiment is Unique Mobility, Inc. of Golden, Colorado, USA. More generally, the identification of the specific contents of the various look-up maps corresponding to a particular vehicle would be well within the abilities of one ordinarily skilled in the art.

In this embodiment, the energy supply routine 128 programs or configures the microprocessor 120 to define various registers in the RAM 124, including the following: a vehicle speed register 136; a brake pedal sensor register 138; a total desired braking torque register 140; a traction motor properties register 142; an energy storage system properties register 143; a maximum available regenerative braking torque register 144; a maximum allowable charging current register 146; an energy storage system setpoint register 148; a charging strategy flag register 150; a desired charging current register 152; an other loads register 153; an energy bus voltage register 154; a traction motor efficiency register 155; a desired current drain register 156 including a torque sub-field 157; a maximum desired regenerative braking torque register 158 including a current subfield 159; a desired APU power output register 160; an actual APU power output register 162; a present desired regenerative braking torque register 164; and a friction braking torque register 186. These registers and their respective contents are discussed in greater detail further below, in the context of the energy supply routine 128.

In this embodiment, the media interface 126 includes a laser disk reader, which employs a laser to read information from a disk 170, which may include a DVD or a CD formatted disk, for example. Alternatively, or in addition, the media interface 126 may include a floppy diskette drive for receiving information from a floppy diskette 172, for example. Alternatively, any other type of computer readable media may be substituted for the disk 170 or the diskette 172, and appropriate corresponding media readers may be substituted for the media interface 126. Such computer readable media may be employed instead of, or in addition to, the non-volatile memory 122, in order to provide or update the various routines and/or the look-up maps stored in the non-volatile memory 122.

Referring to FIGS. 4 and 5, in this embodiment the microprocessor 120 is in further communication with an input interface 180 and with an output interface 182, for receiving communication signals from various devices of the vehicle 48, and for transmitting control signals to such devices, respectively. To achieve this, in the present embodiment the input and output interfaces 180 and 182 are in communication with the communications network 90 shown in FIG. 4. The input interface 180 and the output interface 182 may include separate interfaces such as those shown in FIG. 5, for example, or alternatively, may include a single input/output ("I/O") interface.

In this embodiment, the input interface 180 receives, from the communications network 90, signals from the various devices connected thereto (or their respective interfaces), including signals from the first current sensor 96, from the auxiliary power unit 64, from the second current sensor 104, from the brake pedal sensor 82, from the energy storage system 62, from the regenerative braking system 46, from the speedometer 84 and from the charging strategy selector 110. Such signals are relayed to the microprocessor 120.

In this embodiment, the output interface 182 transmits control signals from the microprocessor 120 via the communications network 90, to the interfaces 94, 100, 106 and 98 of the auxiliary power unit 64, the regenerative braking system 46, the friction braking system 80 and the energy storage system 62, respectively.

Referring to FIG. 5, in the present embodiment the microprocessor 120 is in further communication with an external communications interface 184. The external communications interface 184 may be used to enable the microprocessor 120 to communicate with devices outside the hybrid electric vehicle 48, and may include a wireless communications interface for communicating with a network such as the internet, for example. If desired, the external communications interface 184 may be employed to enable an external control device to transmit control signals to the microprocessor 120 to cause it to alter or update the routines and look-up maps stored in the non-volatile memory 122. Similarly, the external communications interface 184 may be used to enable an external control device to transmit to the processor circuit a control signal such as the signal 123, the signal including code segments for directing the processor circuit to carry out functions similar to those of the energy supply routine 128, or other functions, if desired.

Figure 6:
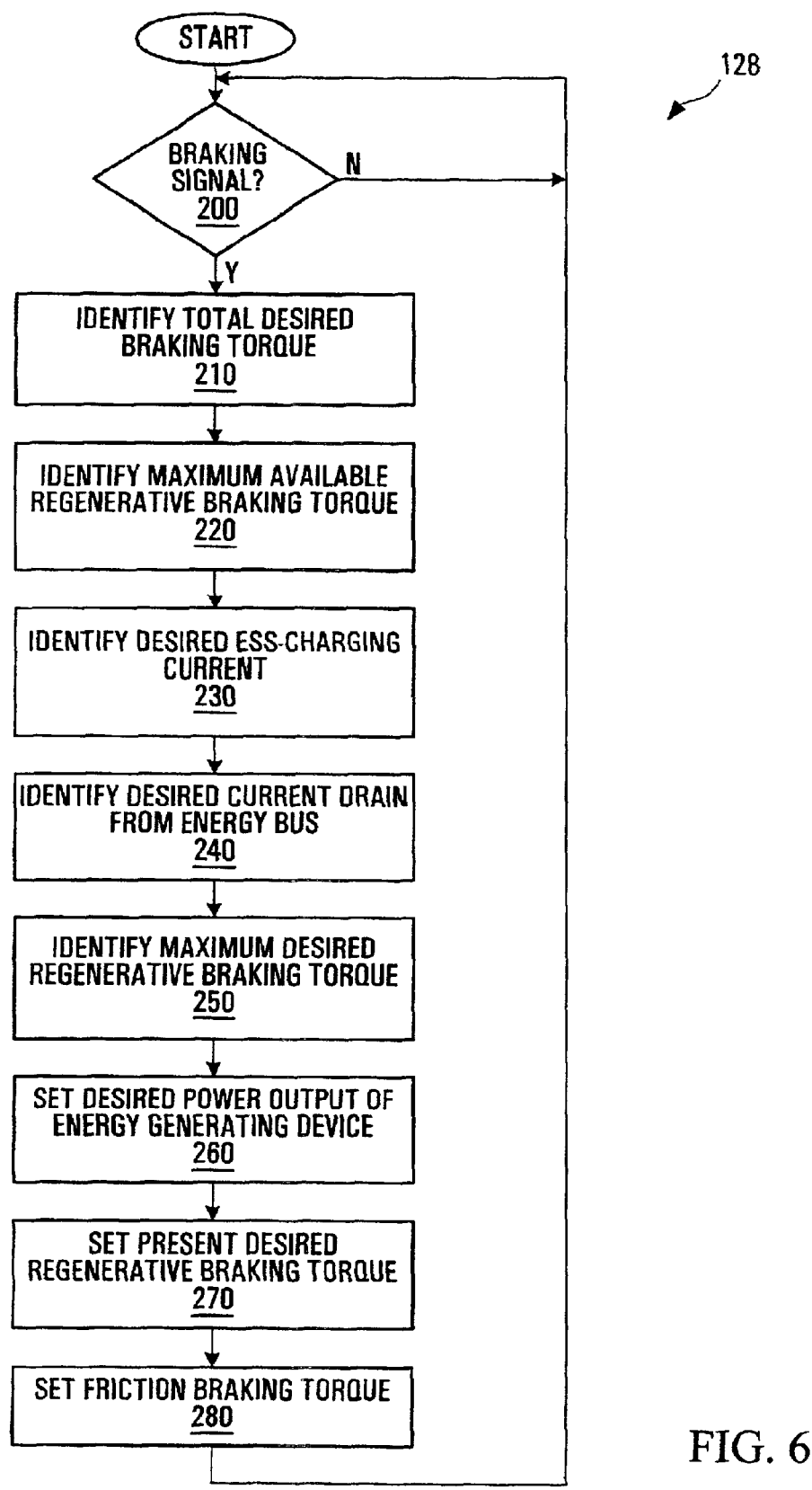
FIG. 6 is a flowchart of an energy supply routine executed by the processor circuit shown in FIG. 5.

Referring to FIGS. 4, 5 and 6, the energy supply routine is shown generally at 128 in FIG. 6. Generally, the energy supply routine 128 programs or configures the processor circuit 50 to control power supplied by the energy generating device 44 to the energy bus 42, in response to the braking signal 52 indicative of user brake actuation. The energy supply routine 128 of the present embodiment also configures the processor circuit 50 to control the energy contributions onto the energy bus 42 from the energy generating device 44 and from the regenerative braking system 46 respectively, to prevent the contributions from exceeding a desired total energy contribution.

Referring to FIGS. 2, 4, 5 and 6, the energy supply routine 128 begins with a first block 200 of codes which directs the processor circuit 50 to receive a braking signal indicative of user brake actuation. More particularly, block 200 directs the processor circuit to monitor the braking signal 52 received from the brake pedal sensor 82 via the communications network 90, to determine whether the braking signal is indicative of actuation by a user of a brake pedal of the vehicle to which the brake pedal sensor 82 is connected. Various ways of monitoring such signals and determining whether brake actuation has occurred would be readily apparent to those ordinarily skilled in the art upon review of this specification. For example, in the present embodiment, the brake pedal sensor 82 generates signals indicative of a position of the brake pedal of the vehicle 48, and block 200 directs the processor circuit to periodically receive such signals from the brake pedal sensor 82, and to maintain, in the brake pedal sensor register 138, a present brake pedal position value produced in response to the signals presently received from the brake pedal sensor 82 via the network 90, and a previous brake pedal position value produced in response to the signals received from the brake pedal sensor 82 at the time of the most recent previous brake pedal position determination. If both the present and previous brake pedal position values stored in the brake pedal sensor register 138 are equal to zero, there is no need to execute the remainder of the energy supply routine 128, as the user is not presently depressing the brake pedal, and the energy supply routine 128 will have executed at least once with a total desired braking torque of zero, allowing both regenerative and friction braking to reset to zero. Conversely, if at least one of the present brake pedal position value and the previous brake pedal position value is not equal to zero, then block 200 directs the processor circuit 50 to respond to the signals received from the brake pedal sensor 82 by executing the remainder of the energy supply routine 128, and in this regard, the processor circuit is directed to block 210 discussed below. Alternatively, other ways of determining whether a braking signal has been received may be substituted.

In this embodiment, block 210 directs the processor circuit 50 to identify a total desired braking torque in response to the braking signal 52 received from the brake pedal sensor 82. To achieve this, block 210 directs the processor circuit to receive signals from the speedometer 84 via the network 90 representing the current speed of the vehicle, and to store a value representing this current vehicle speed in the vehicle speed register 136 of the RAM 124. Block 210 then directs the processor circuit to use the present vehicle speed value stored in the vehicle speed register 136, and the present brake pedal position value stored in the brake pedal sensor register 138, to locate and address a corresponding record in the desired braking torque look-up map 130 stored in the non-volatile memory 122. Upon locating the corresponding record in the desired braking torque look-up map, block 210 directs the processor circuit to copy the contents of a total desired braking torque field (not shown) of the record into the total desired braking torque register 140 of the RAM 124. Alternatively, however, other ways of determining the total desired braking torque in response to a braking signal may be substituted. For example, if desired, the present and previous brake pedal position values stored in the brake pedal sensor register 138 may be used to calculate a rate of change of the brake pedal position, representing the speed with which the user has depressed the brake pedal, this rate of change value may be used as an additional variable to address the desired braking torque look-up map 130, in order to effectively provide a brake assist function, to provide greater braking torque in response to a faster or more urgent actuation of the brake pedal by the user. Or, as a further example, the desired braking torque may be calculated from a predefined formula.

Referring to FIGS. 2, 4, 5 and 6, block 220 then directs the processor circuit 50 to identify the maximum available regenerative braking torque that could presently be provided by the regenerative braking system 46 of the vehicle 48. In this regard, referring back to FIG. 2, it will be appreciated that if the vehicle 48 is in motion and the traction motors 54 and 56 cease to draw energy from the energy bus 42 to rotate the drive wheels 58 and 60 while remaining engaged with the drive wheels, the forward momentum of the vehicle 48 causes the drive wheels 58 and 60 to continue rotating, thus forcing the traction motors 54 and 56 to rotate. The traction motors thus act as generators driven by the drive wheels, supplying energy to the energy bus 42, by converting the vehicle's kinetic energy into electricity. Block 220 directs the processor circuit 50 to identify the maximum regenerative braking torque that the traction motors 54 and 56 could presently apply to the drive wheels 58 and 60 in order to decelerate the vehicle 48. To achieve this, block 220 directs the processor circuit to receive signals from the regenerative braking system 46 via its communications interface 100 and the network 90, representing the present rotational speeds and the temperatures of the traction motors 54 and 56, and to store these values in the traction motor properties register 142 of the RAM 124. Block 220 then directs the processor circuit to use these rotational speed and temperature values to locate and address a corresponding record in the maximum available regenerative braking torque look-up map 132 in the non-volatile memory 122. Upon locating such a record, block 220 directs the processor circuit to copy the contents of a maximum available regenerative braking torque field (not shown) of the addressed record of the look-up map 132 into the maximum available regenerative braking torque register 144 of the RAM 124.

Block 230 then directs the processor circuit 50 to identify a desired charging current for charging the energy storage system 62 of the vehicle 48. In the present embodiment, the manner in which the desired charging current is determined depends upon whether the charging strategy selector 110 indicates a "fast" (or "opportunistic") charging strategy, or whether it indicates a "float" charging strategy. In this regard, block 230 directs the processor circuit to receive a signal from the charging strategy selector 110 via the network 90, and to store a corresponding value in the charging strategy flag register 150, representing either a fast or a float charging strategy.

If the charging strategy flag register 150 contents are set active to indicate fast charging, block 230 directs the processor circuit to identify, as the desired charging current, a maximum allowable charging current for charging the energy storage system 62. To achieve this, block 230 directs the processor circuit 50 to receive signals from the ESS 62 via its interface 98 and the network 90, indicating a maximum allowable charging current value calculated by the ESS controller 72, and further directs the processor circuit to store this value in the maximum allowable charging current register 146. In this regard, in the present embodiment the ESS controller 72 monitors the state of charge and the temperature of the at least one battery 70, in response to which it calculates the maximum allowable charging current that can be applied to the at least one battery 70 without exceeding a predetermined maximum battery voltage, and transmits signals representing this maximum allowable charging current onto the network 90 for receipt by the processor circuit 50. Alternatively, if desired, the maximum allowable charging current may be calculated by the processor circuit 50, for example, by receiving signals representing the state of charge and temperature of the at least one battery 70 and storing such values in the ESS properties register 143, then using such values to locate and address a corresponding record in the maximum charging current look-up map 133, and copying the contents of a maximum allowable charging current field (not shown) of the addressed record to the maximum allowable charging current register 146 and the desired charging current register 152. As a further alternative, if desired, a control loop may be implemented to apply a correction to the maximum allowable charging current. For example, once the maximum allowable charging current has been initially determined by either the processor circuit 50 or the ESS controller 72 at block 230, and has been actually applied to the ESS 62 as a result of the execution of blocks 260 and 270 discussed below, the battery voltage may be measured by the ESS controller 72 while the maximum allowable charging current is being applied, and if the battery voltage is less than the known maximum battery voltage, the maximum allowable charging current may be increased until the battery voltage equals the maximum battery voltage. Irrespective of how the maximum allowable charging current register 146 contents are obtained, if the charging strategy flag register 150 contents are set active to indicate fast charging, block 230 directs the processor circuit 50 to copy the contents of the maximum allowable charging current register 146 to the desired charging current register 152.

Alternatively, if the contents of the charging strategy flag register 150 are inactive to indicate a float charging strategy, block 230 directs the processor circuit 50 to identify the desired charging current for charging the ESS 62, by receiving signals from the energy storage system 62 via its communications interface 98 and the network 90, representing a desired ESS charge setpoint that has been determined by the ESS controller 72. In response to such signals representing the ESS charge setpoint, block 230 directs the processor circuit to store a corresponding value in the ESS setpoint register 148. Block 230 then directs the processor circuit to copy the contents of the ESS setpoint register 148 to the desired charging current register 152.

Block 240 then directs the processor circuit 50 to identify a desired current drain from the energy bus 42. In this embodiment, the desired current drain represents the total electrical current that is to be drawn from the energy bus 42 while regenerative braking is in progress. Thus, in the present embodiment, the desired current drain includes the desired charging current for charging the energy storage system 62, stored in the desired charging current register 152 of the RAM 124. In the present embodiment, the desired current drain further includes any currents drawn by the other high voltage loads 74, including the transformer 76. To identify the desired current drain, in the present embodiment, block 240 directs the processor circuit 50 to receive a signal from the second current sensor 104 via the network 90, representing the electrical current presently being drawn by the other high voltage loads 74, as measured by the second current sensor 104. Block 240 directs the processor circuit to store a value representing the measured drawn current in the other loads register 153 of the RAM 124. Block 240 then directs the processor to add the contents of the desired charging current register 152 and the other loads register 153, and to store the resulting sum in the desired current drain register 156.

Block 250 then directs the processor circuit 50 to identify a maximum desired regenerative braking torque, in response to the total desired braking torque and the maximum available regenerative braking torque. In this regard, in the present embodiment, in order to prevent voltage and current spikes on the energy bus 42 which would potentially damage the energy storage system 62 or one or more of the other high voltage loads 74, it is desirable to control the respective energy contributions of the regenerative braking system 46 and of the energy generating device 44, to prevent their respective energy contributions from exceeding a total desired energy contribution. In this embodiment, the total desired energy contribution is equal to the desired current drain value stored in the desired current drain register 156. In order to control these energy contributions, a maximum desired regenerative braking torque value is identified and a corresponding desired output of the energy generating device is also identified, as discussed in greater detail below. The actual regenerative braking torque is then increased as quickly as possible (by increasing the setpoint or present desired regenerative braking torque) to the maximum desired regenerative braking torque while preventing the contributions of the energy generating device and of the regenerative braking system from exceeding the total desired energy contribution.

In this embodiment, to identify the maximum desired regenerative braking torque, block 250 first directs the processor circuit 50 to calculate a torque equivalent of the desired current drain value stored in the desired current drain register 156. To calculate the torque equivalent, block 250 first directs the processor circuit to receive signals from the regenerative braking system 46 via the network 90 representing the rotational speed R (in radians per second) of the traction motors 54 and 56, and to store this value in the traction motor properties register 142. Block 250 then directs the processor circuit to receive signals from the voltage sensor 97 via the network 90 representing a measurement of the present voltage V on the energy bus 42, and to store a value representing the present energy bus voltage V in the energy bus voltage register 154. Block 250 then directs the processor circuit to multiply the voltage value stored in the energy bus voltage register 154 by the current value stored in the desired current drain register 156, to produce a corresponding power value P. The processor circuit is then directed to use this power value P and the traction motor rotational speed value R stored in the traction motor properties register 142 to locate and address a corresponding record in the second traction motor efficiency look-up map 135. Upon locating the corresponding record, block 250 directs the processor circuit to copy an efficiency value E stored in an efficiency field (not shown) of the addressed record in the efficiency look-up map, to the traction motor efficiency register 155 in the RAM 124. Block 250 then directs the processor circuit to calculate the torque equivalent of the desired current drain as follows:

$$\tau = \frac{VI}{RE}$$

wherein:
T=the torque equivalent of the desired current drain;
V=the present DC voltage on the energy bus 42, stored in the energy bus voltage register 154;
I=the desired current drain, stored in the desired current drain register 156;
R=the rotational speed of the traction motors, stored in the traction motor properties register 142; and
E=the traction motor efficiency value stored in the traction motor efficiency register 155.

Block 250 directs the processor circuit to store the calculated torque equivalent in the torque subfield 157 of the desired current drain register 156.

Block 250 then directs the processor circuit 50 to identify the maximum desired regenerative braking torque, by setting the contents of the maximum desired regenerative braking torque register 158 equal to the lesser of: the total desired braking torque value stored in the total desired braking torque register 140; the maximum available regenerative braking torque value stored in the maximum available regenerative braking torque register 144, and; the torque equivalent of the desired current drain, stored in the torque sub-field 157 of the desired current drain register 156. Thus, the maximum desired regenerative braking torque is not permitted to exceed the torque equivalent of the desired current drain, nor is it permitted to exceed either the total desired braking torque or the maximum available regenerative braking torque.

Block 260 then directs the processor circuit 50 to set a desired power output of the energy generating device 44, in response to the maximum desired regenerative braking torque identified above at block 250. More particularly, block 260 configures the processor circuit to set the desired power output by setting a desired current level of the auxiliary power unit 64 of the vehicle 48.

In this regard, in the present embodiment, as noted, it is desirable to prevent the energy contributions of the regenerative braking system 46 and the energy generating device 44 from exceeding the total desired energy contribution, which in this embodiment is the contents of the desired current drain register 156. If this necessitates a reduction in the power supplied by either the energy generating device 44 or the regenerative braking system 46, then it is preferable to reduce the power supplied by the energy generating device 44, while permitting the regenerative braking system 46 to provide the maximum desired regenerative braking current to the energy bus 42. Conversely, however, if the sum of energy contributions of the energy generating device and the regenerative braking system would not exceed the total desired energy contribution, it is not necessary to reduce the output of the energy generating device.

In addition, in the present embodiment, when the energy supply routine 128 is first executed in response to a new braking signal detected at block 200, it is desirable to proactively control the energy supplied by the energy generating device 44 to the energy bus 42, before the regenerative braking system 46 first begins supplying energy to the energy bus, in order to proactively prevent the total energy on the energy bus from exceeding the total desired energy contribution, in contrast with conventional reactive systems which typically do nothing until after an over-voltage condition is already in the process of occurring. Thus, in this embodiment, on the first execution of the energy supply routine 128, block 260 configures the processor circuit 50 to commence the controlling of the energy supplied by the energy generating device 44 no later than a time at which the regenerative braking system 46 of the vehicle 48 commences supplying energy to the energy bus. More particularly, in this embodiment the first execution of block 260 configures the processor circuit to commence controlling such energy supplied by the energy generating device before commencement of the supply of regenerative braking energy to the energy bus, as the latter does not occur until the first execution of block 270 (discussed below) in the present embodiment.

In view of the foregoing, in this embodiment, to set the desired power output of the energy generating device 44, block 260 first directs the processor circuit 50 to receive signals from the auxiliary power unit 64 via its communications interface 94 and the network 90, the signals representing a present desired current level of the auxiliary power unit 64. More particularly, in this embodiment, the present desired current level includes an APU setpoint that has been established by a separate energy management controller (not shown, not part of this invention). Alternatively, if desired, such signals may be received from the energy management controller via the network 90. Block 260 directs the processor circuit to store a value corresponding to the received signals in the desired APU power output register 160.

Block 260 then directs the processor circuit 50 to calculate a current equivalent of the maximum desired regenerative braking torque value stored in the maximum desired regenerative braking torque register 158.

To calculate the current equivalent, it will be recalled that at block 250 above, the processor circuit was directed to receive signals from the regenerative braking system 46 via the network 90 representing the rotational speed R (in radians per second) of the traction motors 54 and 56, and to store this value in the traction motor properties register 142, and likewise, the processor circuit was directed to receive signals from the voltage sensor 97 via the network 90 representing a measurement of the present voltage V on the energy bus 42, and to store a value representing the present energy bus voltage V in the energy bus voltage register 154. Due to the negligible time elapsed between execution of block 250 and block 260, these values R and V will generally continue to be sufficiently accurate that re-measuring these values is unnecessary. Alternatively, however, these values may be re-measured and stored at block 260 if desired. Block 260 then directs the processor circuit to use the maximum desired regenerative braking torque value T stored in the maximum desired regenerative braking torque register 158, and the traction motor rotational speed R stored in the traction motor properties register 142, to locate and address a corresponding record in the first traction motor efficiency look-up map 134. Upon locating the corresponding record, block 260 directs the processor circuit to copy an efficiency value E stored in an efficiency field (not shown) of the addressed record in the efficiency look-up map, to the traction motor efficiency register 155 in the RAM 124. Block 260 then directs the processor circuit to calculate the current equivalent of the maximum desired regenerative braking torque, as follows:

$$I = \frac{TRE}{V}$$

wherein:
I=the current equivalent of the maximum desired regenerative braking torque;
T=the maximum desired regenerative braking torque value stored in the maximum desired regenerative braking torque register 158;
R=the rotational speed of the traction motors, stored in the traction motor properties register 142;
E=the traction motor efficiency value stored in the traction motor efficiency register 155; and
V=the present DC voltage on the energy bus 42, stored in the energy bus voltage register 154.

Block 260 directs the processor circuit 50 to store the calculated current equivalent I in the current sub-field 159 of the maximum desired regenerative braking torque register 158.

Block 260 then directs the processor circuit 50 to set the desired current level of the auxiliary power unit 64 equal to the lesser of: the present desired current level of the APU, stored in the desired APU power output register 160, and; the desired current drain value stored in the desired current drain register 156 minus the current equivalent of the maximum desired regenerative braking torque stored in the current sub-field 159. Block 260 directs the processor circuit to store this new desired current level in the desired APU power output register 160, and to transmit control signals via the network 90 to the interface 94 of the auxiliary power unit 64, to specify the new desired current level or current setpoint for the auxiliary power unit 64. In this embodiment, the interface 94 of the auxiliary power unit includes a controller (not shown) that receives these signals from the processor circuit specifying the current setpoint, monitors the actual current output of the auxiliary power unit, and adjusts the actual current output of the APU to cause it to conform to the specified current setpoint. Thus, it will be appreciated that if, prior to execution of block 260, the present desired current level or current setpoint of the APU plus the current equivalent of the maximum desired regenerative braking torque would exceed the total desired energy contribution (in this embodiment, the contents of the desired current drain register 156), then the effect of block 260 is to cause the processor circuit to reduce the power supplied by the energy generative device to the energy bus by reducing the desired current level of the APU, in order to make room for the full current equivalent of the maximum desired regenerative braking torque on the energy bus 42, without the total energy exceeding the desired current drain from the energy bus. Conversely, however, if, prior to execution of block 260, the sum of the present desired current level or setpoint of the APU plus the current equivalent of the maximum desired regenerative braking torque would not exceed the total desired energy contribution, then the desired current level or current setpoint of the APU is effectively unchanged.

Block 270 then directs the processor circuit 50 to set a present desired regenerative braking torque of the regenerative braking system 46 of the vehicle 48, in response to the maximum desired regenerative braking torque and the power supplied by the energy generating device 44 to the energy bus 42. In this regard, it will be appreciated that if the desired current level of the auxiliary power unit 64 was reduced at block 260, there may be a slight delay while the auxiliary power unit output drops from its previous level to its new desired current level as established by the processor circuit at block 260. During this delay time, it is desirable not to set the present desired regenerative braking torque equal to the maximum desired regenerative braking torque, as this may result in a voltage spike and a current spike on the energy bus 42 exceeding the desired current drain, during the delay time in which the auxiliary power unit has not yet dropped its output to the desired level. To prevent such spikes from occurring and potentially damaging the energy storage system 62 and the other high voltage loads 74, block 270 effectively configures the processor circuit 50 to increase the power supplied by the regenerative braking system 46 to the energy bus 42, while reducing the power supplied by the energy generating device 44 to the energy bus (the latter reducing commencing when the processor circuit set the present desired current level of the APU 64 at block 260 above, and continuing through the delay during which the APU reduces its output to this new desired current level). More particularly, in this embodiment block 270 directs the processor circuit to increase such power by increasing a regenerative braking torque applied by the regenerative braking system 46 until a desired regenerative braking torque, namely the maximum desired regenerative braking torque, is achieved.

To achieve this, in the present embodiment, block 270 directs the processor circuit 50 to set the present desired regenerative braking torque in response to the maximum desired regenerative braking torque and the power presently being actually supplied by the auxiliary power unit 64 to the energy bus 42. More particularly, block 270 directs the processor circuit to receive signals from the first current sensor 96 via the network 90, representing the actual current presently supplied by the auxiliary power unit 64 to the energy bus 42. Block 270 then directs the processor circuit to store a value representing this actual APU current in the actual APU power output register 162. Block 270 then directs the processor circuit to set the present desired regenerative braking torque equal to the lesser of: the maximum desired regenerative braking torque value stored in the maximum desired regenerative braking torque register 158, and; a torque equivalent of the desired current drain value stored in the desired current drain register 156 minus the actual current supplied by the energy generating device to the energy bus stored in the actual APU power output register 162. This torque equivalent of the difference between the desired current drain and the actual current supplied by the APU is calculated in a manner similar to that discussed above in connection with block 250. In the present embodiment, this calculation of the present desired regenerative braking torque at block 270 is subjected to the further constraint that the present desired regenerative braking torque is not permitted to be less than zero (this could occur, for example, in the event that the actual current supplied by the APU to the energy bus already exceeds the desired current drain). Block 270 directs the processor circuit to store the present desired regenerative braking torque value in the present desired regenerative braking torque register 184. Block 270 further directs the processor circuit to transmit control signals via the network 90 to the interface 100 of the regenerative braking system 46, to cause the traction motors 54 and 56 to apply a regenerative braking torque to the drive wheels 58 and 60 equal to the torque value specified in the present desired regenerative braking torque register 164. In this embodiment, the interface 100 of the regenerative braking system includes a traction motor controller (not shown) that receives these signals from the processor circuit specifying the present desired regenerative braking torque, monitors the braking torque presently applied by the traction motors, and adjusts the braking torque applied by the traction motors to cause it to conform to the specified present desired regenerative braking torque.

It will be appreciated that blocks 260 and 270 effectively direct the processor circuit 50 to reduce power supplied by the energy generating device 44 to the energy bus 42, while increasing power supplied by the regenerative braking system 46 to the energy bus. Block 270 effectively configures the processor circuit to increase the regenerative braking torque applied by the regenerative braking system 46 until a desired regenerative braking torque, namely the contents of the maximum desired regenerative braking torque register 158 is achieved, while at the same time the power supplied by the auxiliary power unit 64 is being reduced to its new output level established at block 260.

Block 280 then directs the processor circuit 50 to set a friction braking torque of the friction braking system 80 of the vehicle 48. More particularly, block 280 directs the processor circuit to set the friction braking torque equal to a difference between the present desired regenerative braking torque and the total desired braking torque. To achieve this, block 280 directs the processor circuit to subtract the contents of the present desired regenerative braking torque register 164 from the contents of the total desired braking torque register 140, and to store the resulting difference in the friction braking torque register 166. If the resulting friction braking torque value is greater than zero, block 280 directs the processor circuit to transmit control signals via the network 90 to the control interface 106 of the friction braking system 80, to cause the friction braking system 80 to apply a frictional braking torque equal to that specified in the friction braking torque register 166 to the wheels of the vehicle 48. In this regard, in the present embodiment the interface 106 of the friction braking system includes a friction brake controller (not shown) that receives these signals from the processor circuit specifying the required friction braking torque, monitors the friction torque presently applied by the friction braking system, and adjusts the braking torque applied by the friction braking system to cause it to conform to the specified required friction braking torque.

Following execution of block 280, the processor circuit is directed back to block 200 as discussed above.

It will be appreciated that a number of advantages may flow from specific embodiments of the invention such as the second embodiment described above. For example, the second specific embodiment described above provides proactive avoidance of over-voltage conditions on the energy bus that would otherwise be potentially damaging to the energy storage system and to other electronic components in communication with the energy bus, such as the other loads. Thus, the effective service lifetimes of the energy storage system and of other electronic components of the vehicle are improved. Auxiliary power unit transients may be further minimized in situations where an opportunistic or fast charging strategy is selected. By reducing the output of the auxiliary power unit in order to accommodate a maximum amount of regenerative braking energy, vehicle efficiency is increased, with the result that fuel consumption and emissions by the auxiliary power unit are reduced. The use of friction brakes to complement the regenerative braking system serves to ensure that adequate braking torque is available, while transparently providing a predictable, constant and smooth brake feel to the operator, supplying the expected total braking torque in response to brake actuation, irrespective of the precise proportions of regenerative and friction braking. At the same time, however, maximizing the amount of regenerative braking also serves to reduce friction brake wear, by reducing the frequency and required torque of friction braking events, thereby reducing maintenance costs of the vehicle. However, although such advantages flow from the second specific embodiment of the invention described above, it will be appreciated that not all embodiments of the invention necessarily provide these advantages.

More generally, while specific embodiments of the invention have been described and illustrated, such embodiments should be considered illustrative of the invention only and not as limiting the invention as construed in accordance with the accompanying claims.

What is claimed is:

1. A method of supplying energy to an energy bus in communication with an energy generating device and with a regenerative braking system in a hybrid electric vehicle, the method comprising controlling power supplied by the energy generating device to the energy bus, in response to a braking signal indicative of user brake actuation.

2. The method of claim 1 wherein controlling power comprises controlling power supplied by an auxiliary power unit (APU) of the vehicle.

3. The method of claim 2 wherein controlling power comprises controlling a current supplied by a generator.

4. The method of claim 2 wherein controlling power comprises controlling a current supplied by a fuel cell.

5. The method of claim 1 wherein controlling comprises commencing said controlling no later than a time at which the regenerative braking system of the vehicle commences supplying energy to the energy bus.

6. The method of claim 1 wherein controlling comprises reducing said power supplied by the energy generating device to the energy bus.

7. The method of claim 6 further comprising increasing power supplied by the regenerative braking system of the vehicle to the energy bus, while reducing said power supplied by the energy generating device to the energy bus.

8. The method of claim 7 wherein increasing power comprises increasing a regenerative braking torque applied by the regenerative braking system until a desired regenerative braking torque is achieved.

9. The method of claim 1 further comprising identifying a total desired braking torque in response to the braking signal.

10. The method of claim 9 further comprising identifying a maximum available regenerative braking torque.

11. The method of claim 10 further comprising identifying a maximum desired regenerative braking torque, in response to said total desired braking torque and said maximum available regenerative braking torque.

12. The method of claim 11 wherein identifying said maximum desired regenerative braking torque comprises setting said maximum desired regenerative braking torque equal to the lesser of:
(a) said total desired braking torque;
(b) said maximum available regenerative braking torque; and
(c) a torque equivalent of a desired current drain from the energy bus, said desired current drain comprising a desired charging current for charging an energy storage system (ESS) in communication with the energy bus.

13. The method of claim 12 further comprising identifying, as said desired charging current, a maximum allowable charging current for charging the ESS.

14. The method of claim 11 wherein controlling comprises setting a desired power output of the energy generating device, in response to said maximum desired regenerative braking torque.

15. The method of claim 14 wherein setting said desired power output comprises setting a desired current level of an auxiliary power unit (APU) of the vehicle.

16. The method of claim 15 wherein setting said desired current level of the APU comprises setting said desired current level equal to the lesser of:
(a) a present desired current level of the APU; and
(b) a desired current drain from the energy bus comprising a desired charging current for charging an energy storage system (ESS) in communication with the energy bus, minus a current equivalent of said maximum desired regenerative braking torque.

17. The method of claim 16 further comprising identifying, as said desired charging current, a maximum allowable charging current for charging the ESS.

18. The method of claim 11 further comprising setting a present desired regenerative braking torque of a regenerative braking system of the vehicle, in response to the maximum desired regenerative braking torque and the power supplied by the energy generating device to the energy bus.

19. The method of claim 18 wherein setting said present desired regenerative braking torque comprises setting said present desired regenerative braking torque equal to the lesser of
(a) said maximum desired regenerative braking torque; and
(b) a torque equivalent of:
(i) a desired current drain from the energy bus, said desired current drain comprising a desired charging current for charging an energy storage system (ESS) in communication with the energy bus; minus
(ii) an actual current supplied by the energy generating device to the energy bus.

20. The method of claim 19 further comprising identifying, as said desired charging current, a maximum allowable charging current for charging the ESS.

21. The method of claim 18 further comprising setting a friction braking torque of a friction braking system of the vehicle.

22. The method of claim 21 wherein setting said friction braking torque comprises setting said friction braking torque equal to a difference between said present desired regenerative braking torque and said total desired braking torque.

23. The method of claim 1 wherein controlling comprises controlling energy contributions onto the energy bus from the energy generating device and from a regenerative braking system of the vehicle respectively, to prevent said contributions from exceeding a desired total energy contribution.

24. An apparatus for supplying energy to an energy bus in communication with an energy generating device and with a regenerative braking system in a hybrid electric vehicle, the apparatus comprising a processor circuit configured to control power supplied by the energy generating device to the energy bus, in response to a braking signal indicative of user brake actuation.

25. The apparatus of claim 24 wherein said processor circuit is configured to control said power by controlling power supplied by an auxiliary power unit (APU) of the vehicle.

26. The apparatus of claim 25 wherein said processor circuit is configured to control said power by controlling a current supplied by a generator.

27. The apparatus of claim 25 wherein said processor circuit is configured to control said power by controlling a current supplied by a fuel cell.

28. The apparatus of claim 24 wherein said processor circuit is configured to commence said controlling no later than a time at which the regenerative braking system of the vehicle commences supplying energy to the energy bus.

29. The apparatus of claim 24 wherein said processor circuit is configured to control said power by reducing said power supplied by the energy generating device to the energy bus.

30. The apparatus of claim 29 wherein said processor circuit is configured to increase power supplied by a regenerative braking system of the vehicle to the energy bus, while reducing said power supplied by the energy generating device to the energy bus.

31. The apparatus of claim 30 wherein said processor circuit is configured to increase a regenerative braking torque applied by the regenerative braking system until a desired regenerative braking torque is achieved.

32. The apparatus of claim 24 wherein said processor circuit is configured to identify a total desired braking torque in response to the braking signal.

33. The apparatus of claim 32 wherein said processor circuit is configured to identify a maximum available regenerative braking torque.

34. The apparatus of claim 33 wherein said processor circuit is configured to identify a maximum desired regenerative braking torque, in response to said total desired braking torque and said maximum available regenerative braking torque.

35. The apparatus of claim 34 wherein said processor circuit is configured to set said maximum desired regenerative braking torque equal to the lesser of:
(a) said total desired braking torque;
(b) said maximum available regenerative braking torque; and
(c) a torque equivalent of a desired current drain from the energy bus, said desired current drain comprising a desired charging current for charging an energy storage system (ESS) in communication with the energy bus.

36. The apparatus of claim 35 wherein said processor circuit is configured to identify, as said desired charging current, a maximum allowable charging current for charging the ESS.

37. The apparatus of claim 34 wherein said processor circuit is configured to control said power by setting a desired power output of the energy generating device, in response to said maximum desired regenerative braking torque.

38. The apparatus of claim 37 wherein said processor circuit is configured to set said desired power output by setting a desired current level of an auxiliary power unit (APU) of the vehicle.

39. The apparatus of claim 38 wherein said processor circuit is configured to set said desired current level of the APU equal to the lesser of:
(a) a present desired current level of the APU; and
(b) a desired current drain from the energy bus comprising a desired charging current for charging an energy storage system (ESS) in communication with the energy bus, minus a current equivalent of said maximum desired regenerative braking torque.

40. The apparatus of claim 39 wherein said processor circuit is configured to identify, as said desired charging current, a maximum allowable charging current for charging the ESS.

41. The apparatus of claim 34 wherein said processor circuit is configured to set a present desired regenerative braking torque of a regenerative braking system of the vehicle, in response to the maximum desired regenerative braking torque and the power supplied by the energy generating device to the energy bus.

42. The apparatus of claim 41 wherein said processor circuit is configured to set said present desired regenerative braking torque equal to the lesser of:
(a) said maximum desired regenerative braking torque; and
(b) a torque equivalent of:
(i) a desired current drain from the energy bus, said desired current drain comprising a desired charging current for charging an energy storage system (ESS) in communication with the energy bus:
minus
(ii) an actual current supplied by the energy generating device to the energy bus.

43. The apparatus of claim 42 wherein said processor circuit is configured to identify, as said desired charging current, a maximum allowable charging current for charging the ESS.

44. The apparatus of claim 41 wherein said processor circuit is configured to set a friction braking torque of a friction braking system of the vehicle.

45. The apparatus of claim 44 wherein said processor circuit is configured to set said friction braking torque equal to a difference between the present desired regenerative braking torque and the total desired braking torque.

46. The apparatus of claim 24 wherein said processor circuit is configured to control energy contributions onto the energy bus from the energy generating device and from a regenerative braking system of the vehicle respectively, to prevent said contributions from exceeding a desired total energy contribution.

47. A system comprising the apparatus of claim 24 and further comprising the energy generating device, said energy generating device being in communication with said processor circuit and with the energy bus.

48. The system of claim 47 wherein said energy generating device comprises an auxiliary power unit (APU) of the vehicle.

49. The system of claim 48 wherein said APU comprises a generator.

50. The system of claim 48 wherein said APU comprises a fuel cell.

51. The system of claim 47 further comprising the energy bus.

52. The system of claim 47 further comprising the regenerative braking system, the regenerative braking system being in communication with said processor circuit and with the energy bus.

53. The system of claim 52 wherein said processor circuit is configured to increase power supplied by said regenerative braking system to the energy bus, while reducing said power supplied by said energy generating device to the energy bus.

54. The system of claim 52 further comprising an energy storage system (ESS) in communication with the energy bus.

55. An apparatus for supplying energy to an energy bus in communication with energy generating means and with regenerative braking means in a hybrid electric vehicle, the apparatus comprising:
means for receiving a braking signal indicative of user brake actuation; and
means for controlling power supplied by the energy generating means to the energy bus, in response to the braking signal.

56. The apparatus of claim 55 wherein said means for controlling power comprises means for controlling power supplied by an auxiliary power unit (APU) of the vehicle.

57. The apparatus of claim 55 wherein said means for controlling comprises means for commencing said controlling no later than a time at which the regenerative braking means of the vehicle commences supplying energy to the energy bus.

58. The apparatus of claim 55 wherein said means for controlling comprises means for reducing said power supplied by the energy generating means to the energy bus.

59. The apparatus of claim 58 further comprising means for increasing power supplied by a regenerative braking means of the vehicle to the energy bus, while said means for reducing is reducing the power supplied by the energy generating means to the energy bus.

60. The apparatus of claim 59 wherein said means for increasing power comprises means for increasing a regenerative braking torque applied by the regenerative braking means until a desired regenerative braking torque is achieved.

61. The apparatus of claim 55 further comprising means for identifying a total desired braking torque in response to the braking signal.

62. The apparatus of claim 61 further comprising means for identifying a maximum available regenerative braking torque.

63. The apparatus of claim 62 further comprising means for identifying a maximum desired regenerative braking torque, in response to said total desired braking torque and said maximum available regenerative braking torque.

64. The apparatus of claim 63 wherein said means for controlling comprises means for setting a desired power output of the energy generating means, in response to the maximum desired regenerative braking torque.

65. The apparatus of claim 64 wherein said means for setting said desired power output comprises means for setting a desired current level of an auxiliary power unit (APU) of the vehicle.

66. The apparatus of claim 63 further comprising means for setting a present desired regenerative braking torque of a regenerative braking means of the vehicle, in response to the maximum desired regenerative braking torque and the power supplied by the energy generating device to the energy bus.

67. The apparatus of claim 66 further comprising means for setting a friction braking torque of a friction braking means of the vehicle.

68. The apparatus of claim 67 wherein said means for setting the friction braking torque comprises means for setting the friction braking torque equal to a difference between said present desired regenerative braking torque and said total desired braking torque.

69. The apparatus of claim 55 wherein said means for controlling comprises first means for controlling a first energy contribution onto the energy bus from the energy generating means, and further comprising second means for controlling a second energy contribution onto the energy bus from a regenerative braking means of the vehicle, wherein said first and second means for controlling cooperate to prevent said contributions from exceeding a desired total energy contribution.

70. A system comprising the apparatus of claim 55 and further comprising said energy generating means for generating said power supplied by said energy generating means to the energy bus, said energy generating means being in communication with said means for reducing power and with the energy bus.

71. The system of claim 70 wherein said energy generating means comprises an auxiliary power unit (APU) of the vehicle.

72. The system of claim 70 further comprising the regenerative braking means for regeneratively braking the vehicle, said regenerative braking means being in communication with the energy bus.

73. The system of claim 72 further comprising an energy storage means for storing energy, in communication with the energy bus.

74. A computer readable medium providing codes for directing a processor circuit to control power supplied by an energy generating device to an energy bus in communication with the energy generating device and with a regenerative braking system in a hybrid electric vehicle, in response to a braking signal indicative of user brake actuation.

75. A signal comprising code segments for directing a processor circuit to control power supplied by an energy generating device to an energy bus in communication with the energy generating device and with a regenerative braking system in a hybrid electric vehicle, in response to a braking signal indicative of user brake actuation.

76. A method of supplying energy to an energy bus in a hybrid electric vehicle, the method comprising controlling energy contributions onto the energy bus from an energy generating device and from a regenerative braking system respectively, wherein controlling comprises preventing said contributions from exceeding a desired total energy contribution.

77. The method of claim 76 wherein controlling comprises reducing power supplied by the energy generating device to the energy bus.

78. The method of claim 76 wherein controlling comprises reducing power supplied by the energy generating device to the energy bus, while increasing power supplied by the regenerative braking system to the energy bus.

79. The method of claim 78 wherein increasing power comprises increasing a regenerative braking torque applied by the regenerative braking system until a desired regenerative braking torque is achieved.

80. The method of claim 76 further comprising identifying a maximum desired regenerative braking torque to be applied by the regenerative braking system.

81. The method of claim 80 wherein controlling comprises setting a desired energy contribution of the energy generating device, in response to the maximum desired regenerative braking torque.

82. The method of claim 80 further comprising setting a present desired regenerative braking torque of the regenerative braking system, in response to the maximum desired regenerative braking torque and an actual energy contribution supplied by the energy generating device to the energy bus.

83. The method of claim 76 wherein controlling comprises controlling power supplied by the energy generating device to the energy bus, in response to a braking signal indicative of user brake actuation.

84. An apparatus for supplying energy to an energy bus in a hybrid electric vehicle, the apparatus comprising a processor circuit configured to control energy contributions onto the energy bus from an energy generating device and from a regenerative braking system respectively, wherein said processor circuit is configured to prevent said contributions from exceeding a desired total energy contribution.

85. The apparatus of claim 84 wherein said processor circuit is configured to reduce power supplied by the energy generating device to the energy bus.

86. The apparatus of claim 84 wherein said processor circuit is configured to reduce power supplied by the energy generating device to the energy bus, while increasing power supplied by the regenerative braking system to the energy bus.

87. The apparatus of claim 86 wherein said processor circuit is configured to increase a regenerative braking torque applied by the regenerative braking system until a desired regenerative braking torque is achieved.

88. The apparatus of claim 84 wherein said processor circuit is configured to identify a maximum desired regenerative braking torque to be applied by the regenerative braking system.

89. The apparatus of claim 88 wherein said processor circuit is configured to set a desired energy contribution of the energy generating device, in response to the maximum desired regenerative braking torque.

90. The apparatus of claim 88 wherein said processor circuit is configured to set a present desired regenerative braking torque of the regenerative braking system, in response to the maximum desired regenerative braking torque and an actual energy contribution supplied by the energy generating device to the energy bus.

91. The apparatus of claim 84 wherein said processor circuit is configured to control power supplied by the energy generating device to the energy bus, in response to a braking signal indicative of user brake actuation.

92. An apparatus for supplying energy to an energy bus in a hybrid electric vehicle, the apparatus comprising:
first means for controlling a first energy contribution onto the energy bus from energy generating means; and
second means for controlling a second energy contribution onto the energy bus from regenerative braking means,
wherein said first and second means for controlling cooperate to prevent said contributions from exceeding a desired total energy contribution.

93. The apparatus of claim 92 wherein said first means for controlling comprises means for reducing power supplied by the energy generating means to the energy bus.

94. The apparatus of claim 92 wherein said second means for controlling comprises means for increasing power supplied by the regenerative braking means to the energy bus, and wherein said first means for controlling comprises means for reducing power supplied by the energy generating means to the energy bus, while said second means for controlling is increasing said power supplied by the regenerative braking means.

95. The apparatus of claim 94 wherein said means for increasing power comprises means for increasing a regenerative braking torque applied by the regenerative braking means until a desired regenerative braking torque is achieved.

96. The apparatus of claim 92 further comprising means for identifying a maximum desired regenerative braking torque to be applied by the regenerative braking means.

97. The apparatus of claim 96 wherein said first means for controlling comprises means for setting a desired energy contribution of the energy generating means, in response to the maximum desired regenerative braking torque.

98. The apparatus of claim 96 wherein said second means for controlling comprises means for setting a present desired regenerative braking torque of the regenerative braking means, in response to the maximum desired regenerative braking torque and an actual energy contribution supplied by the energy generating means to the energy bus.

99. The apparatus of claim 92 wherein said first means for controlling comprises means for reducing power supplied by the energy generating means to the energy bus, in response to a braking signal indicative of user brake actuation.

100. A computer readable medium providing codes for directing a processor circuit to control energy contributions onto an energy bus in a hybrid electric vehicle from an energy generating device and from a regenerative braking system respectively, wherein said codes direct said processor circuit to prevent said contributions from exceeding a desired total energy contribution.

101. A signal comprising code segments for directing a processor circuit to control energy contributions onto an energy bus in a hybrid electric vehicle from an energy generating device and from a regenerative braking system respectively, wherein said code segments direct said processor circuit to prevent said contributions from exceeding a desired total energy contribution.

* * * * *